US008995455B1

(12) United States Patent
Dropps et al.

(10) Patent No.: US 8,995,455 B1
(45) Date of Patent: Mar. 31, 2015

(54) MEMORY DEVICES FOR NETWORK DEVICES AND ASSOCIATED METHODS

(71) Applicant: QLogic, Corporation, Aliso Viejo, CA (US)

(72) Inventors: Frank R. Dropps, Maple Grove, MN (US); Craig M. Verba, Maple Grove, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 225 days.

(21) Appl. No.: 13/678,108

(22) Filed: Nov. 15, 2012

(51) Int. Cl.
*H04L 12/28* (2006.01)
*H04L 12/56* (2006.01)
*H04L 12/879* (2013.01)

(52) U.S. Cl.
CPC .................... *H04L 49/901* (2013.01)
USPC ............ 370/412; 370/413; 370/414; 370/415

(58) Field of Classification Search
CPC ......... H04L 29/06; H04L 69/18; H04L 41/22; H04L 41/082; H04L 45/50
USPC .................. 370/214–218, 228–229
See application file for complete search history.

(56) References Cited

U.S. PATENT DOCUMENTS

| | | | | |
|---|---|---|---|---|
| 6,240,096 B1* | 5/2001 | Book | ............................. | 370/412 |
| 6,877,049 B1* | 4/2005 | Myers | ............................. | 710/56 |
| 7,856,026 B1* | 12/2010 | Finan et al. | .................... | 370/412 |
| 7,996,485 B2* | 8/2011 | Brown | .......................... | 709/213 |
| 8,706,939 B2* | 4/2014 | Ishikawa | ........................ | 710/241 |
| 2008/0101354 A1* | 5/2008 | Arndt | ............................ | 370/389 |
| 2011/0044344 A1* | 2/2011 | Hudson et al. | ............ | 370/395.53 |
| 2012/0317423 A1* | 12/2012 | Dolgunov et al. | ............ | 713/190 |
| 2013/0286845 A1* | 10/2013 | Smith et al. | ................. | 370/235.1 |
| 2014/0226675 A1* | 8/2014 | Chrysos et al. | ................ | 370/412 |

* cited by examiner

*Primary Examiner* — Kwang B Yao
*Assistant Examiner* — Adam Duda
(74) *Attorney, Agent, or Firm* — Klein, O'Neill & Singh, LLP

(57) ABSTRACT

One method includes: (a) providing a memory storage device having a plurality of storage locations for storing information received by a plurality of sub-ports of a base port of the network device, where the memory storage device is shared among the plurality of sub-ports such that each sub-port is given access to the memory storage device at a certain phase of a system clock cycle; (b) storing a packet or a portion thereof at one of the storage locations when a sub-port that receives the packet has access to one or more of the storage locations; and (c) scrambling addresses for the memory storage locations such that a different one of the storage location is available to the sub-port of step (b) for a next write operation in a next phase when the sub-port of step (b) is given access to the memory storage device.

19 Claims, 7 Drawing Sheets

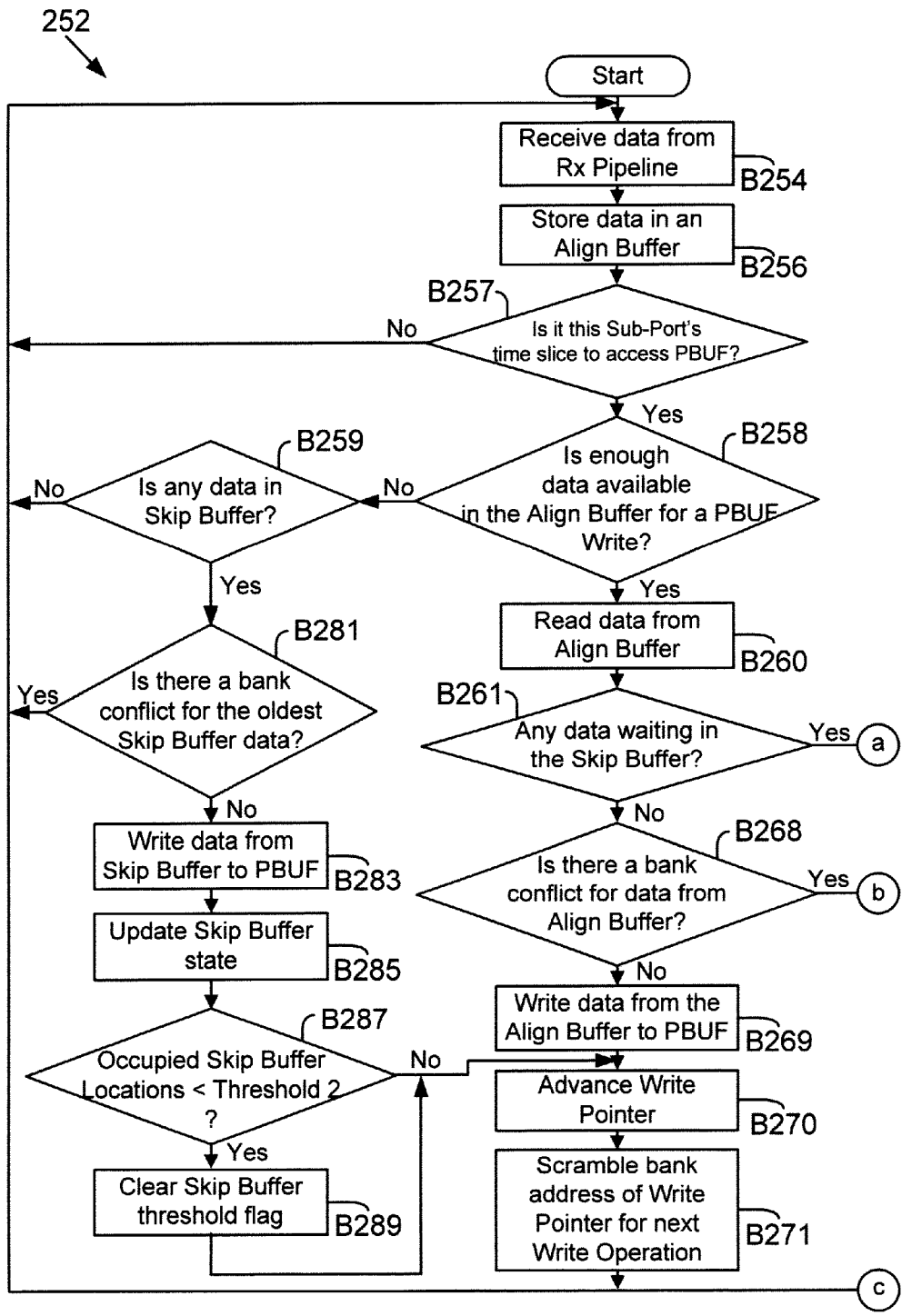
FIG. 2C (Contd..)

| Ethernet Header 302 | FCOE Header 304 | SOF 306 | FC Header 308 | Pay Load 310 | FC CRC 312 | EOF 314 | Ethernet FCS 316 |

300

| Word/Bits | FC Header 308 |||||
|---|---|---|---|---|---|
| | 31      24 | 23      16 | 15      08 | 07      00 ||
| 0 | R_CTL | D_ID      308A |||| 
| 1 | CS_CTL/Priority | S_ID      308B ||||
| 2 | Type | F_CTL ||||
| 3 | SEQ_ID | DF_CTL | SEQ_CNT |||
| 4 | OX_ID || RX_ID |||
| 5 | Parameter |||||

MEMORY DEVICES FOR NETWORK DEVICES AND ASSOCIATED METHODS

BACKGROUND

1. Technical Field

The present disclosure relates to networks and network devices.

2. Related Art

Networking systems are commonly used to move network information (which may also be referred to interchangeably as frames, packets or commands) between computing systems (for example, servers) or between computing systems and network devices (for example, storage systems). Various hardware and software components are used to implement network communication.

A network switch is typically a multi-port device where each port manages a point-to-point connection between itself and an attached system. Each port can be attached to a server, peripheral, input/output subsystem, bridge, hub, router, or another switch. The term network switch as used herein includes a Multi-Level switch that uses plural switching elements within a single switch chassis to route data packets. Different network and storage protocols may be used to handle network information and storage information. Continuous efforts are being made to enhance the use of networking and storage protocols.

SUMMARY

The present embodiments have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

In one embodiment, a machine-implemented method is provided. The method includes: (a) providing a memory storage device having a plurality of storage locations for storing information received by a plurality of sub-ports of a base port of a network device, where the plurality of sub-ports can be configured to operate at more than one operating speed to process packets complying with different protocols and the memory storage device is shared among the plurality of sub-ports such that each sub-port is given access to the memory storage device at a certain phase of a system clock cycle; (b) storing a packet or a portion thereof at one of the storage locations when a sub-port that receives the packet has access to one or more of the storage locations; and (c) scrambling addresses for the memory storage locations such that a different one of the storage locations is available to the sub-port of step (b) for a next write operation in a next phase when the sub-port is given access to the memory storage device.

In another embodiment, a network device is provided. The network device includes a plurality of base-ports, where each base-port is coupled to a plurality of network links and each base-port has a plurality of sub-ports configured to operate independently as a port for sending and receiving information using one of the plurality of network links at a plurality of rates complying with a plurality of protocols; a memory storage device having a plurality of storage locations that are used to store packets received by the plurality of sub-ports; wherein the memory storage device is shared among the plurality of sub-ports such that each sub-port is provided access to one or more storage locations within a certain phase of a system clock cycle for the network device; and a plurality of first stage buffers for each sub-port for staging information before the information is stored at one of the storage locations of the memory storage device. Furthermore, a packet or a portion thereof received by a sub-port is stored at one of the storage locations when the sub-port has access to the memory device; and addresses for the memory storage locations are scrambled such that a different one of the storage locations is available to the sub-port for a next write operation in a next phase when the sub-port is given access to the memory storage device.

In yet another embodiment, a machine-implemented method is provided. The method includes (a) storing data at a first stage buffer of a sub-port from among a plurality of sub-ports of a base port of a network device, where the plurality of sub-ports can be configured to operate at more than one operating speed to process packets complying with different protocols and the memory storage device is shared among the plurality of sub-ports such that each sub-port is given access to a plurality of shared resources of the base port at a certain phase of a system clock cycle; (b) when there is no conflict for the data at the first stage buffer, storing the data at a storage location of a memory storage device having a plurality of storage locations shared among the plurality of sub-ports; and (c) scrambling addresses for the plurality of memory storage locations such that a different one of the storage locations is available to the sub-port receiving the data for a next write operation in a next phase when the sub-port is given access to the memory storage device.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The various present embodiments now will be discussed in detail with an emphasis on highlighting the advantageous features. These embodiments depict the novel and non-obvious systems and methods in networks shown in the accompanying drawings, which are for illustrative purposes only. These drawings include the following figures, in which like numerals indicate like parts:

FIG. 1 is a functional block diagram of a network that the present embodiments may be used in connection with;

DETAILED DESCRIPTION

Figure 1:
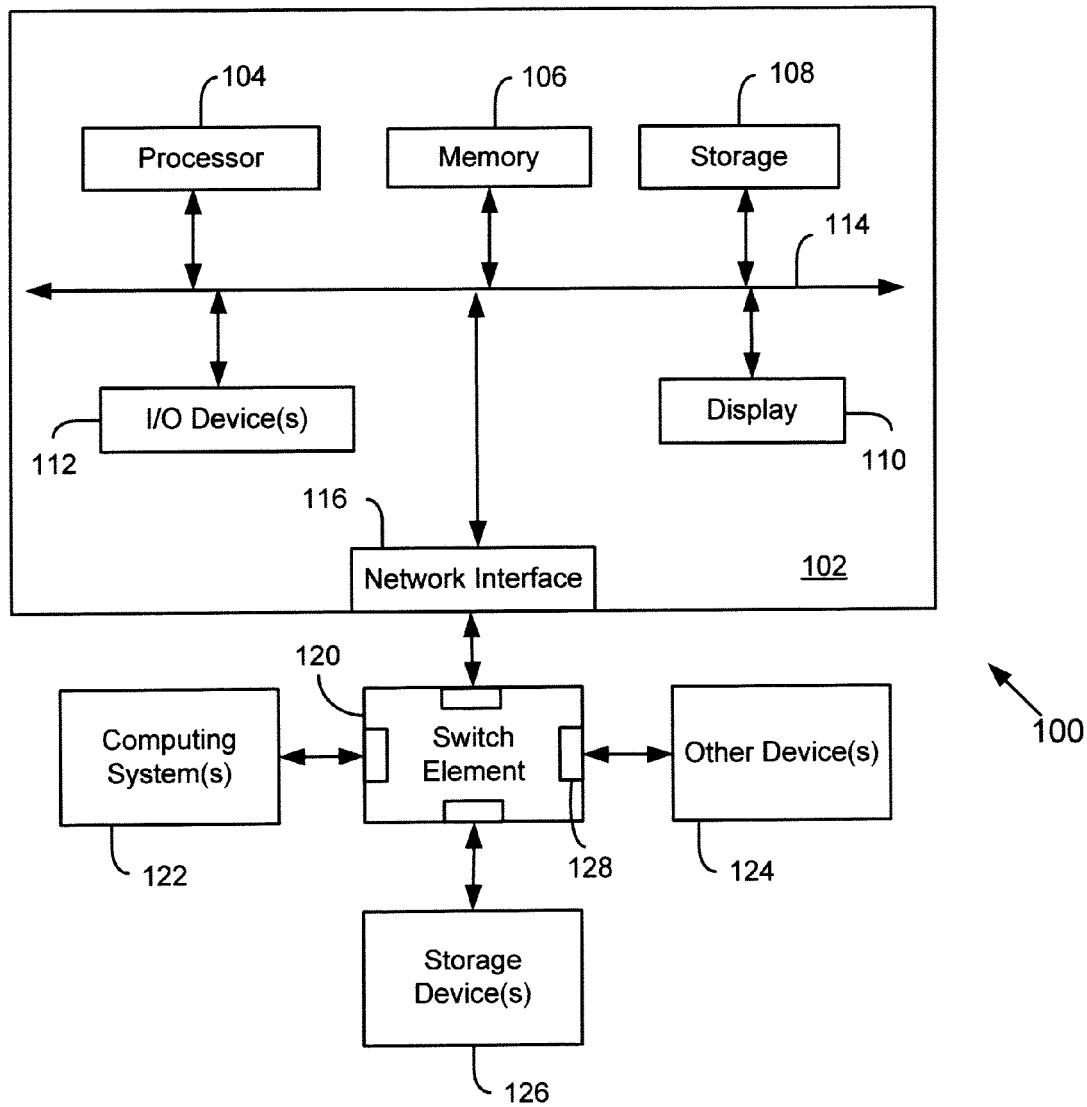

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g. fixed logic circuitry), manual processing, or a combination of these implementations. The terms "logic," "module," "component," "system" and "functionality," as used herein, generally represent software, firmware, hardware, or a combination of these elements. For instance, in the case of a software implementation, the terms "logic," "module," "component," "system," and "functionality" represent program code that performs specified tasks when executed on a processing device or devices (e.g. CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of non-transitory medium for retaining information in any form, including various kinds of storage devices (magnetic, optical, static, etc.).

The embodiments disclosed herein, may be implemented as a computer process (method), a computing system, or as an article of manufacture, such as a computer program product or non-transitory computer-readable media. The computer program product may be computer storage media, readable by a computer device, and encoding a computer program of instructions for executing a computer process. The computer program product may also be a propagated signal on a carrier, readable by a computing system, and encoding a computer program of instructions for executing a computer process.

Various network standards and protocols may be used to enable network communications using the disclosed embodiments, including Fibre Channel (FC), Fibre Channel over Ethernet (FCoE), Ethernet, and others. Below is a brief introduction to some of these standards. The present embodiments are described herein with reference to the Fibre Channel, FCoE and Ethernet protocols. However, these protocols are used merely for ease of reference and to provide examples. The present embodiments are not limited to Fibre Channel, FCoE and Ethernet.

Fibre Channel (FC) is a set of American National Standards Institute (ANSI) standards. Fibre Channel provides a serial transmission protocol for storage and network protocols such as HIPPI, SCSI, IP, ATM and others. Fibre Channel provides an input/output interface to meet the requirements of both Channel and network users. The Fibre Channel standards are incorporated herein by reference in their entirety.

Fibre Channel supports three different topologies: point-to-point, arbitrated loop and Fibre Channel Fabric. The point-to-point topology attaches two devices directly. The arbitrated loop topology attaches devices in a loop. The Fabric topology attaches computing systems directly to a Fabric, which are then connected to multiple devices. The Fibre Channel Fabric topology allows several media types to be interconnected.

A Fibre Channel switch is a multi-port device where each port manages a point-to-point connection between itself and its attached system. Each port can be attached to a server, peripheral, I/O subsystem, bridge, hub, router, or even another switch. A switch receives messages from one port and routes them to other ports. Fibre Channel switches use memory buffers to hold frames received and sent across a network. Associated with these buffers are credits, which are the number of frames that a buffer can hold per Fabric port.

Ethernet is a family of computer networking technologies for local area networks (LANs). Systems communicating over Ethernet divide a stream of data into individual packets called frames. Each frame contains source and destination addresses and error-checking data so that damaged data can be detected and re-transmitted. Ethernet is standardized in IEEE 802.3, which is incorporated herein by reference in its entirety.

Fibre Channel over Ethernet (FCoE) is a converged network and storage protocol for handling both network and storage traffic. The FCoE standard enables network adapters and network switches to handle both network and storage traffic using network and storage protocols. Under FCoE, Fibre Channel frames are encapsulated in Ethernet frames. Encapsulation allows Fibre Channel to use 1 Gigabit Ethernet networks (or higher speeds) while preserving the Fibre Channel protocol.

The systems and processes described below are applicable and useful in the upcoming cloud computing environment. Cloud computing pertains to computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information, to be available, on-demand, like a public utility.

Typical cloud computing providers deliver common business applications online, which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud. After the application layer is a cloud platform and cloud infrastructure, followed by a "server" layer that includes hardware and computer software designed for cloud-specific services.

FIG. 1 illustrates an example of a system 100 that may be used in connection with the present embodiments. System 100 may include a computing system 102, which may be referred to as a host system. A typical host system 102 includes several functional components, including a central processing unit (CPU) (also referred to as a processor or processing module) 104, a host memory (or main/system memory) 106, a storage device 108, a display 110, input/output ("I/O") device(s) 112, and other components (or devices). The host memory 106 is coupled to the processor 104 via a system bus or a local memory bus 114. The processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware-based devices.

The host memory 106 provides the processor 104 access to data and program information that is stored in the host memory 106 at execution time. Typically, the host memory 106 includes random access memory (RAM) circuits, read-only memory (ROM), flash memory, or the like, or a combination of such devices.

The storage device 108 may comprise one or more internal and/or external mass storage devices, which may be or may include any conventional medium for storing large volumes of data in a non-volatile manner. For example, the storage device 108 may include conventional magnetic disks, optical disks such as CD-ROM or DVD-based storage, magneto-optical (MO) storage, flash-based storage devices, or any other type of non-volatile storage devices suitable for storing structured or unstructured data.

The host system 102 may also include a display device 110 capable of displaying output, such as an LCD or LED screen and others, and one or more input/output (I/O) devices 112, for example, a keyboard, mouse, etc. The host system 102 may also include other devices/interfaces for performing various functions, details of which are not germane to the inventive embodiments described herein.

The host system 102 also includes a network interface 116 for communicating with other computing systems 122, storage devices 126, and other devices 124 via a switch 120 and various links. The network interface 116 may comprise a network interface card (NIC) or any other device for facilitating communication between the host system 102, other computing systems 122, storage devices 126, and other devices 124. The network interface 116 may include a converged network adapter, such as that provided by QLogic Corporation for processing information complying with storage and network protocols, for example, Fibre Channel and Ethernet. As an example, the network interface 116 may be a FCoE adapter. In another embodiment, the network interface 116 may be a host bus adapter, for example, a Fibre Channel host bus adapter, such as that provided by QLogic Corporation. Details regarding the network interface 116 are not provided since they are not germane to the inventive embodiments described herein.

In one embodiment, the processor 104 of the host system 102 may execute various applications, for example, an e-mail server application, databases, and other application types. Data for various applications may be shared between the computing systems 122 and stored at the storage devices 126. Information may be sent via switch 120 ports. The term port as used herein includes logic and circuitry for receiving, processing, and transmitting information.

Each device (e.g. the host system 102, the computing systems 122, the storage devices 126, and the other devices 124) may include one or more ports for receiving and transmitting information, for example, node ports (N_Ports), Fabric ports (F_Ports), and expansion ports (E_Ports). Node ports may be located in a node device, e.g. the network interface 116 of host system 102 and interface (not shown) for the storage devices 126. Fabric ports are typically located in Fabric devices, such as the switch 120. Details regarding the switch 120 are provided below.

Figure 2A:
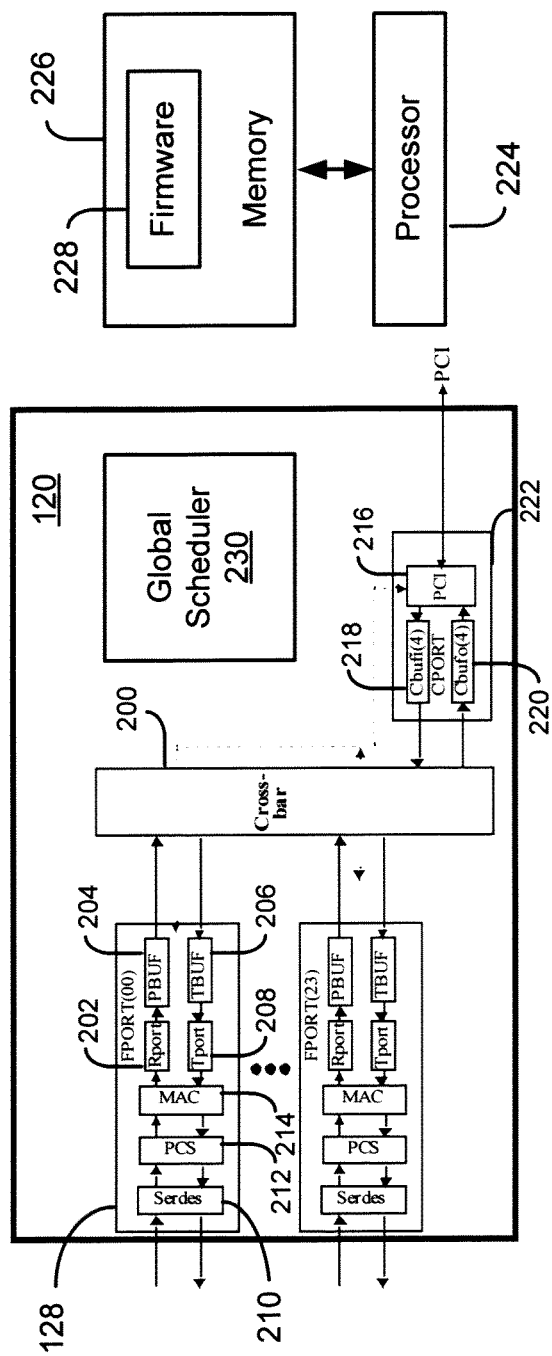
FIG. 2A is a functional block diagram of a switch element according to the present embodiments.

FIG. 2A is a high-level block diagram of the switch 120, also referred to as the switch element 120. Switch element 120 may be implemented as an application specific integrated circuit (ASIC) having a plurality of ports 128. The ports 128 are generic (GL) and may include an N_Port, F_Port, FL_Port, E-Port, or any other port type. The ports 128 may be configured to operate as Fibre Channel, FCoE, or Ethernet ports. In other words, depending upon what it is attached to, each GL port can function as any type of port. As an example, the ports 128 of FIG. 2A are drawn on the same side of the switch element 120. However, the ports 128 may be located on any or all sides of switch element 120. This does not imply any difference in port or ASIC design. The actual physical layout of the ports will depend on the physical layout of the ASIC.

The ports 128 communicate via a switch crossbar 200, which may include a plurality of switch crossbars for handling specific types of data and data flow control information. For illustration purposes only, the switch crossbar 200 is shown as a single crossbar. The switch crossbar 200 may be a connectionless crossbar (packet switch) of conventional design, sized to connect a plurality of paths. This is to accommodate the ports 128 plus a port 216 for connection to a processor 224 that may be external to the switch element 120. In another embodiment, the processor 224 may be located within a switch chassis that houses the switch element 120.

Each port 128 receives incoming frames (or information) and processes the frames according to various protocol requirements. The port 128 includes a shared pipeline for receiving frames (or information). The pipeline includes a serializer/deserializer (SERDES) 210, a physical coding sub-layer (PCS) 212, and a media access control (MAC) sub-layer 214. The SERDES 210 receives incoming serial data and converts it to parallel data. The parallel data is then sent to the PCS 212 and the MAC 214 before being sent to a receive segment (or receive port (RPORT) 202. PCS 212 performs 8b-10b coding, the details of which are not germane to the embodiments disclosed herein.

The RPORT 202 temporarily stores received frames at a memory storage device, shown as PBUF (pause buffer) 204. The frames are then sent to a transmit segment (or transmit port (TPORT)) via the crossbar 200 and a transmit buffer (TBUF) 206. The TBUF 206 is a temporary memory storage device where frames or information related to frames are staged before being transmitted.

The switch element 120 may also include a control port (CPORT) 216 that communicates with the processor 224. The CPORT 216 may be used for controlling and programming the switch element 120. In one embodiment, the CPORT 216 may include a PCI (Peripheral Component Interconnect) 222 interface to enable the switch element 120 to communicate with the processor 224 and a memory 226. The processor 224 controls overall switch element operations, and the memory 226 stores firmware instructions 228 for controlling switch element 120 operations.

The CPORT 216 includes an input buffer (CBUFI) 218, which is used to transmit frames from the processor 224 to the ports 128. The CPORT 216 further includes an output buffer (CBUFO) 220, which is used to send frames from the PBUFs 204, the TBUFs 206, and CBUFI 218 to the processor 224.

Port 128 described above may be referred to as a "base-port" that may have more than one network link available for receiving and transmitting information. Each network link allows the base-port to be configured into a plurality of sub-ports, each uniquely identified for receiving and sending frames. The configuration may vary based on protocol and transfer rates. For example, port 128 may be configured to operate as four single lane Ethernet ports, three single lane Ethernet ports and one single lane Fibre Channel port, two single lane Ethernet ports and two single lane Fibre Channel ports, one single lane Ethernet port and three single lane Fibre Channel ports, four single lane Fibre Channel ports, two double lane Ethernet ports, 1 double lane Ethernet port and two single lane Ethernet ports, one double lane Ethernet port, one single lane Ethernet port and one single lane Fibre Channel port, one double lane Ethernet port and two single lane Fibre Channel ports, one four lane Ethernet port, or one four lane Fibre Channel port. Port 128 uses some logic that is shared among the multiple sub-ports and some logic that is dedicated to each sub-port.

Switch 120 also includes a global scheduler 230 that schedules frame transmissions from one or more ports of the switch. Global scheduler 230 interfaces with various switch modules to schedule frame transmissions.

Figure 2B:
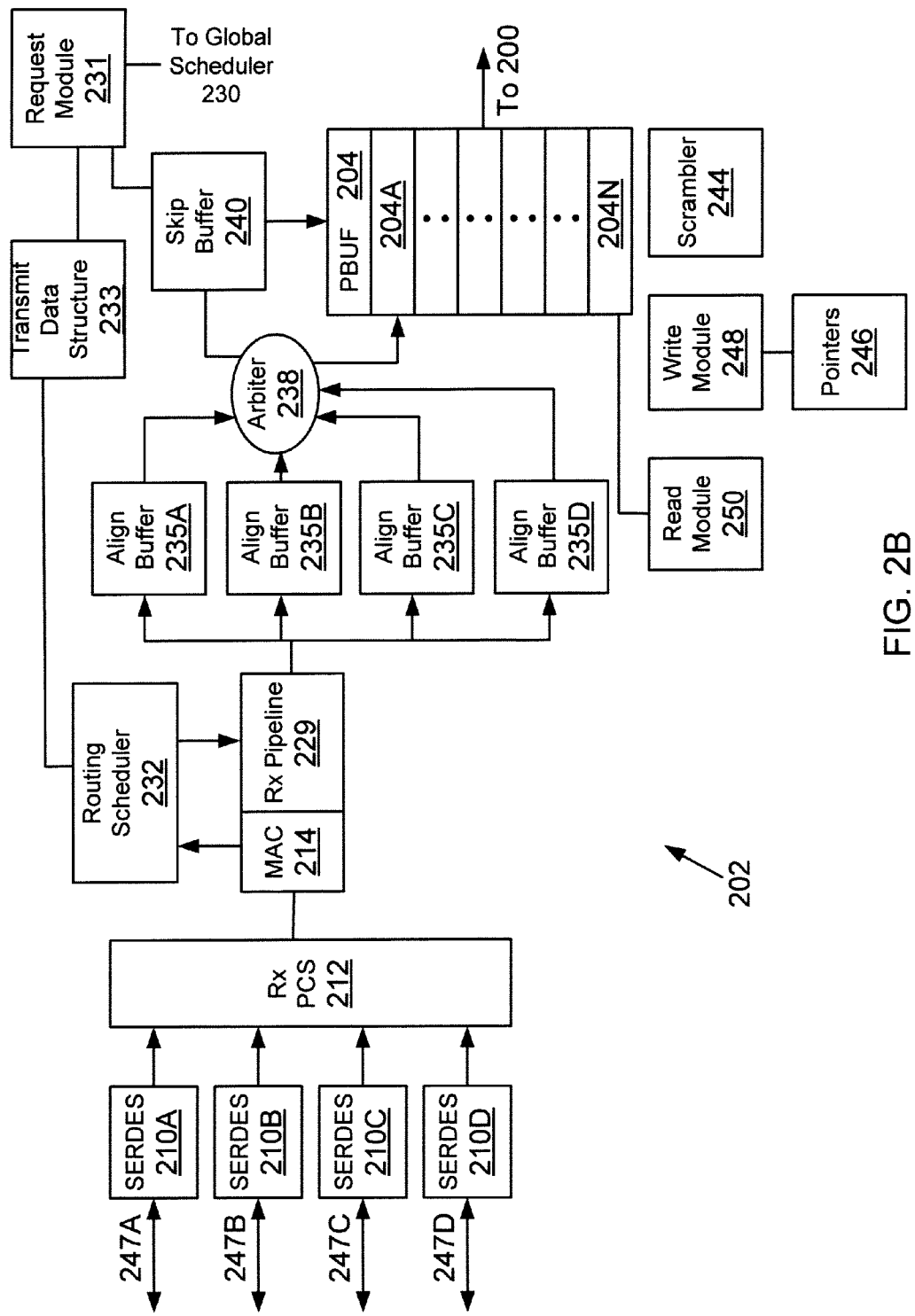
FIG. 2B is a functional a block diagram of an RPORT, according to one embodiment.

FIG. 2B illustrates an example of RPORT 202 of base-port 128, according to one embodiment. RPORT 128 may be coupled to four independent physical network links (or lanes) 247A-247D, each configured to operate as a portion of an independent sub-port. Each network link is coupled to one of the SERDES 210A-210D that share PCS 212 and MAC 214. The multiple lanes also share a receive pipeline 229 that is used for pre-processing received frames before they are transferred. Both MAC 214 and receive pipelines 229 are time multiplexed so that they can be shared among the plurality of links based on how the ports are configured to operate. In one embodiment, PCS 212 and MAC 214 are part of the receive pipeline 229.

RPORT 202 includes a plurality of align buffers (or first stage buffers/first stage storage devices) 235A-235D that are used for staging frames before they can be stored at a skip buffer (or second stage buffer/second stage storage device) 240 or a shared PBUF 204, as described below in detail. In one embodiment, the align buffers 235A-235D are dedicated to each network lane 247A-247D and are used to align the data to match the PBUF 204 slot sizes. In another embodiment, the align buffers 235A-235D may be shared among the different lanes.

Align buffers 235A-235D hold part of a frame until a current frame write operation is complete. In one embodiment, align buffers 235A-235D are used to hold double words received from MAC 214 at a system clock for the various modules of port 128. The system clock may be generated by an oscillator (not shown), the details of which are not germane to embodiments disclosed herein. The system clock may be 825 Mhz, for example, or any other speed. The align buffers 235A-235D may also hold part of a frame, in case the skip buffer 240 has reached its threshold value, e.g., it is full, as described below. The term "buffer" as used herein indicates a storage location/device used for storing information.

Frames are selected from the align buffers 235A-235D by an arbitration module 238. In one embodiment, PBUF 204 may be a dynamic random access memory (DRAM) device used according to the process steps described below in detail. PBUF 204 may include a plurality of storage locations 204A-204N (may also be referred to as slots) for storing frames.

RPORT 202 includes a read module 250 for controlling and managing read operations from PBUF 204. The read operation may be performed across multiple time slices (or time slots). The read module 250 knows which lane and which queue the data has been written from. The read module 250 is also aware of the start of a frame (SOF) so it knows when to roll over a read counter (not shown) that is maintained by the read module 250. The read address is compared with the write address to ensure that it does not exceed the write address for a cut-through frame.

RPORT 202 further includes a write module 248 that controls writing to storage locations 204A-204N. Pointers 246 are maintained by write module 248 indicating where information is stored at PBUF 204 or at skip buffer 240.

RPORT 202 includes a scrambler module 244 for scrambling bank (or memory storage device location/slot) address locations of PBUF 204 that is used for writing a frame at PBUF 204. The bank address is scrambled differently for each sub-port. Instead of a frame always starting in bank 0, the starting bank is scrambled, allowing each sub-port to have a different frame starting bank. One reason for scrambling the address is to reduce bank conflict for accessing a storage location, as described below in detail.

The skip buffer 240 may be used to prevent bank contention at PBUF 204. For example, if skip buffer has 16 slots and 10 (first threshold value) of them become full, then the skip buffer 204 may send a signal to the global scheduler 230 to prevent additional PBUF read operations by stopping more grants from being issued. In another embodiment, the skip buffer 204 may send a signal to the request module 231 inhibiting the request module 231 from sending a request to the global scheduler 230. If no requests are made, no grants are issued, and if no grants are issued a new PBUF 204 read operation will not be started. The skip buffer 240 resumes sending the signals to scheduler 230 when it has fewer than a second threshold value entries (for example, 4 or less of 16).

Figure 2C:
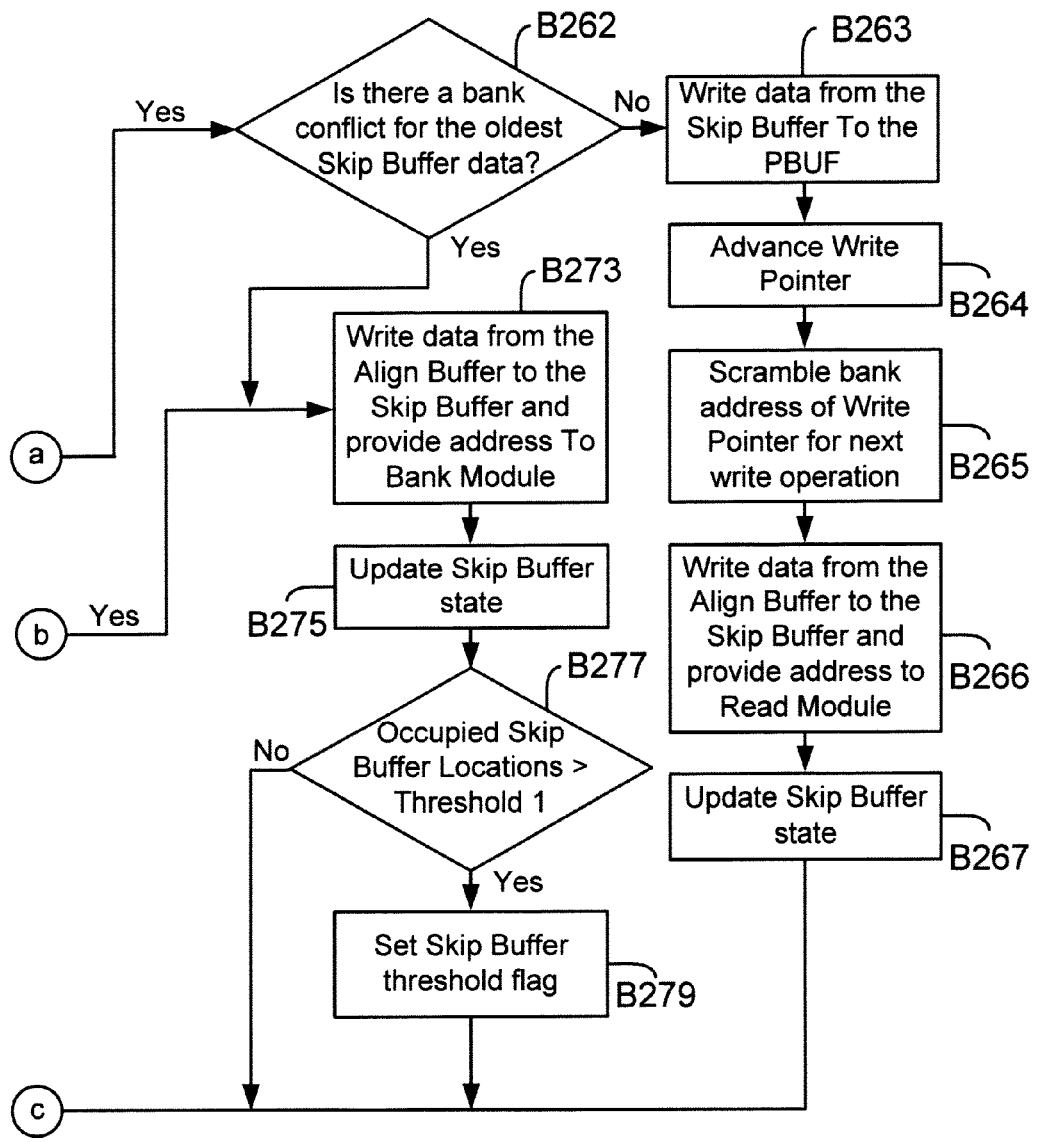
FIGS. 2C-2D are flowcharts, according to the present embodiments.

FIG. 2C illustrates a process 252 for managing skip buffer 240 and PBUF 204, according to one embodiment. The process begins in block B254, when data is received at the RPORT 202 after being processed by the receive pipeline. The received data is stored at one of the align buffers 235A-235D in block B256. In block B257, the process determines if it is the sub-port's time slot. The sub-port in this case is the one that received the data. As described above, each sub-port is provided a time slot (or a phase of the system clock) to use the shared resources of port 128. If it is the sub-port's time slice, then the process determines if there is enough data at the align buffer to write to PBUF 204. The amount of data will depend on the width of PBUF 204 and the rate at which data is being received.

If there is enough data, then in block B260, data is read from one or more of align buffer 235A-235D. Thereafter, in block B261, the process determines if there is any data already waiting in skip buffer 240. If data is waiting, then the write module 248 determines in block B262 if there is a bank conflict for the oldest skip buffer data. A bank conflict in this context means that the read module 250 and the write module 248 both want to access the same memory bank (or location) of PBUF 204. Frame reads from PBUF 204 are made in sequential order so the next PBUF 204 bank address to be read can be computed. A comparison between the PBUF 204 bank address to write into during a next clock cycle and the PBUF 204 bank address to be read in the next clock cycle can be made. There will be a bank conflict on the next clock cycle if these bank addresses match.

In the embodiments presented, preference is given to PBUF 204 read operations so that a write operation is blocked and the read operation is allowed to proceed. In other embodiments, the write operation could be given preference in the conflict case allowing all writes to complete. In yet another embodiment, bank conflict preference could alternate between read and write operations.

In some DRAMS, bank conflict can occur over a two clock cycle period. This means that once a bank has been accessed for a read operation it cannot be read again or written to in the next clock cycle. In one embodiment, memory access alternates between even and odd banks. In other words, access for read or write operations are only made to even-numbered banks on even clocks and to odd-numbered banks on odd clocks. This method ensures that once a bank has been accessed it will be idle during the next clock cycle, thereby reducing the complication of the bank conflict prediction logic, because it only needs to consider the next clock cycle and not the next two clock cycles. When these even-odd accesses are alternated with even and odd clocks, the bank conflict only lasts for one even clock or one odd clock. The clocks referred to herein may be provided by an oscillator (not shown), details of which are not germane to embodiments disclosed herein.

If there is no conflict in block B262, then in block B263, data from the skip buffer 240 is written to one of the locations of PBUF 204. In block B264, the write pointer (246) is advanced and provided to read module 250. This allows the read module 250 to know where data has been written at PBUF 204.

In block B265, the bank address of the write pointer is scrambled for a next write operation. For the next write operation, the bank address where a frame is to be written is scrambled by scrambler 244. As an example, assume that PBUF 204 has 10 banks available for writing with bank addresses 0 to 9. If bank address 1 is written in block B266, then the remaining addresses, e.g., 0 and 2-9, are scrambled and one of the addresses is selected for a next write operation in block B266. The scrambled bank address is provided to the write module 248 for processing a next write operation. In one embodiment, the bank address is scrambled by just adding a fixed value to the unscrambled address. This addition may be performed using a modulus of the number of banks supported. For example, bank address 0 would become 2, 1 would become 3, 2 would become 4, and so on until 8 would become 0 and the last address, 9, would become 1. In yet another embodiment, a hash algorithm may be used to perform the scrambling function. In yet another embodiment, a linear feedback shift register (LFSR) may provide the scrambling function.

In block B266, data is written from the align buffer 235A-235D to the skip buffer 240 and the address is provided to the read module 250. In block B267, the skip buffer state is updated and the process moves back to block B254. The skip buffer state is maintained by a state machine (not shown) that is used to manage skip buffer read and writes. The state machine may be located at any RPORT 202 module.

If there was a bank conflict in block B262, then in block B273, data is written from the align buffer 235A-235D to skip buffer 240 instead, and the address is provided to the read module 250 and the write module 248. This is performed to hold the data until the conflict is resolved. The skip buffer state is then updated in block B275.

In block B277, the write module 248 determines if the occupied skip buffer locations have reached a first threshold value. The first threshold value is used to prevent overflowing skip buffer 240. When the first threshold value is reached, no additional requests are sent to global scheduler 230 and hence no grants are received. If yes, then the skip buffer threshold flag is set in block B279 and the process moves to block B254. If the first threshold value is not reached, then the process moves back to block B254. The threshold value/flag may also be maintained by the state machine that controls skip buffer 240 operations.

Referring back to block B261, if there is no data waiting at the skip buffer 240, then the process determines in block B268 if there is a bank conflict for data stored at the align buffer 235A-235D. If there is conflict, then the process moves to block B273 that has been described above.

If there is no conflict in block B268, then in block B269, data is written from the align buffer to a PBUF location. The write pointer is then advanced in block B270 and in block B271 the bank address of the write pointer is scrambled for the next write operation. The process then moves back to block B254 that has been described above.

Referring back to block B258, if there is no data at the align buffer, then the process moves to block B259, where it is determined if there is any data in skip buffer 240. If there is no data in the skip buffer 240, the process moves to block B254.

If there is data in the skip buffer 240, then the process determines in block B283 if there is a bank conflict for the oldest skip buffer 240 data. If there is a conflict, then the process moves back to block B254. If there is no conflict, then in block B283, data is written from the skip buffer 240 to PBUF 204 location. The skip buffer state is then updated in block B285. In block B287, the process determines if the occupied skip buffer locations are less than the second threshold value. If the second threshold value is not reached, then the process moves to block B270, which is described above. If the second threshold value has been reached, then the process moves to block B289, where the skip buffer threshold flag is cleared and the process moves to block B270, which is described above. The second threshold value is used to start sending requests to scheduler 230 for processing.

Figure 2D:
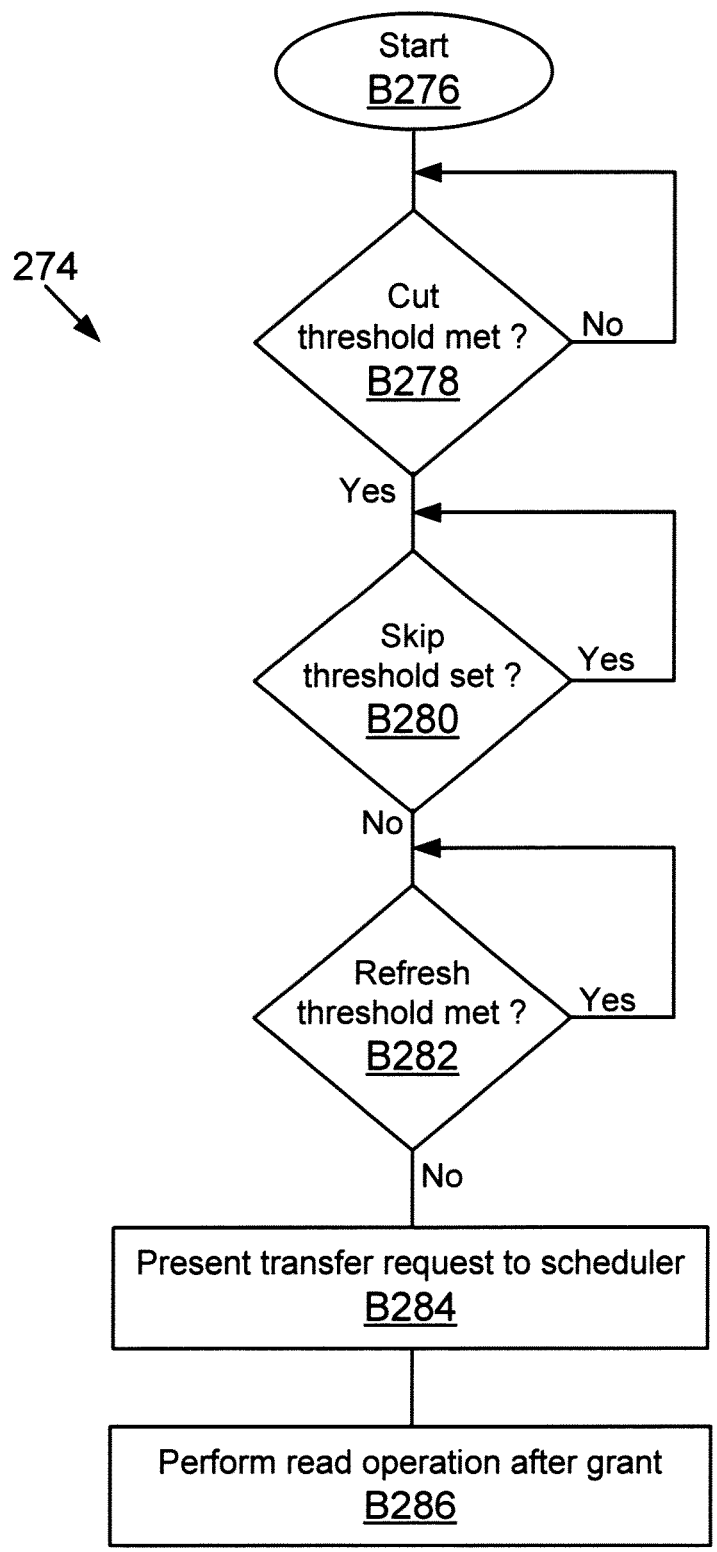

FIG. 2D illustrates a process 274 for performing a read operation from PBUF 204, according to one embodiment. The process begins in block B276. In block B278, the request module 231 determines if a cut threshold has been met. The cut threshold value is set when a certain portion of a frame needs to be received before the read process can begin. If the cut threshold has not been met, then the request module 231 simply waits for more information to be written into PBUF.

If the cut threshold is met in block B278, then the request module 231 determines if the skip threshold flag is set at block B280. If the skip threshold flag is set, then the process waits for the flag to be cleared. If the skip threshold flag is not set, then the process moves to block B282, where the request module 231 determines if the refresh threshold for PBUF 204 has been met. The refresh threshold value is based on how often the DRAM used for PBUF 204 has to be refreshed. This is typically provided by the DRAM manufacturer, and may be programmed in the common segment of the port where port configuration information may be stored or hardwired to the required value.

If the refresh threshold value has been met at block B282, then the read module 250 waits till the memory is refreshed. If the refresh threshold value has not been met, then in block B284 a transfer request is presented to global scheduler for transferring the information from PBUF 204. The information is read in block B286, after the request is granted.

Figures 3A, 3B, 3C:
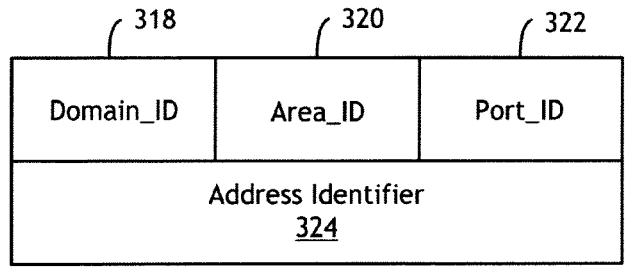
FIGS. 3A-3C are examples of frame formats for frames that are routed by the switch element of FIG. 2A.

FIG. 3A illustrates an example of an FCoE packet format 300 that can be processed and routed by switch element 120, according to the present embodiments. The FCoE packet 300 includes an Ethernet header 302. In one embodiment, the Ethernet header 302 may be 14 bytes in length, for example. The FCoE packet 300 also includes an FCoE header 304 that includes the Ethernet type and version information. A start of frame (SOF) 306 indicates the beginning of a frame and may be 1 byte, for example.

The FCoE packet 300 may also include a Fibre Channel header (FC Header) 308 that may be 24 bytes long with a payload 310. The Fibre Channel cyclic redundancy code (CRC) 312 may be 4 bytes and the end of frame (EOF) 314 may be 1 byte in size. The EOF 514 indicates the end of a frame. The Ethernet FCS 316 is inserted after the EOF 514.

FIG. 3B illustrates a standard 24-bit Fibre Channel address identifier 324 used by switch element 120. The address identifier 324 includes a Domain_ID 318, an Area_ID 320, and a Port_ID 322. The Domain_ID 318 is a Domain identifier based on the upper 8-bits of the 24-bit Fibre Channel address. A Domain includes one or more Fibre Channel switches that has the same Domain_ID for all N_Ports and NL_Ports within or attached to the switches. If there is more than one switch in the Domain, then each switch within the Domain is directly connected via an Inter-Switch Link to at least one other switch in the same Domain.

The Area_ID 320 is an Area identifier based on the middle 8 bits of the 24-bit Fibre Channel address. The Area_ID 320 applies either to (a) one or more N_Ports within and attached to a Fibre Channel switch, or (b) to an Arbitrated Loop of NL_Ports attached to a single FL_Port.

The Port_ID 322 is the lower 8-bits of a Fibre Channel address. The Port_ID 322 applies to either (a) a single N_Port or virtualized N_Port within a Domain/Area, or (b) the valid AL_PA of a single NL_Port or FL_Port on an Arbitrated Loop.

FIG. 3C illustrates an example of the FC header 308 of FIG. 3A. The following frame header fields that may be used by switch element 120 are:

D_ID 308A—A 24-bit Fibre Channel frame header field that contains the destination address for a frame; and S_ID 308B—A 24-bit Fibre Channel frame header field that contains the source address for a frame.

The embodiments disclosed herein use PBUF 204 for storing frames before they are sent to their destinations. Bank contention at PBUF 204 may be reduced by scrambling memory addresses and by using the skip buffer 240.

The above description presents the best mode contemplated for carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above that are fully equivalent. For example, the embodiments disclosed above may be implemented in any network device, including an adapter, router, network interface card and others. Consequently, this invention is not limited to the particular embodiments disclosed. On the contrary, this invention covers all modifications and alternate constructions coming within the spirit and scope of the invention as generally expressed by the following claims, which particularly point out and distinctly claim the subject matter of the invention.

What is claimed is:

1. A network device, comprising:
   a plurality of base-ports, where each base-port is coupled to a plurality of network links and each base-port has a plurality of sub-ports configured to operate independently as a port for sending and receiving information using one of the plurality of network links at a plurality of rates complying with a plurality of protocols;
   a memory storage device having a plurality of storage locations that are used to store packets received by the plurality of sub-ports; wherein the memory storage device is shared among the plurality of sub-ports such that each sub-port is provided access to one or more storage locations within a certain phase of a system clock cycle for the network device;
   a plurality of first stage buffers for each sub-port for staging information before the information is stored at one of the storage locations of the memory storage device;
   wherein a packet or a portion thereof received by a sub-port is stored at one of the storage locations when the sub-port has access to the memory device; and addresses for the memory storage locations are scrambled such that a different one of the storage locations is available to the sub-port for a next write operation in a next phase when the sub-port is given access to the memory storage device; and
   a second stage buffer shared among the plurality of sub-ports and used for staging information between the plurality of first stage buffers and the memory storage device when there is conflict for data at any first stage buffer of the plurality of the first stage buffers.

2. The network device of claim 1, wherein the base port includes a second stage buffer shared among the plurality of sub-ports and used for staging information between the first stage buffers and the memory storage device.

3. The network device of claim 1, wherein one of the plurality of sub-ports is configured to operate as a Fibre Channel port.

4. The network device of claim 1, wherein one of the plurality of sub-ports is configured to operate as an Ethernet or Fibre Channel over Ethernet port.

5. The network device of claim 1, wherein the network device is a switch element.

6. A machine-implemented method, comprising:
   storing data at a first stage buffer of a sub-port from among a plurality of sub-ports of a base port of a network device, where the plurality of sub-ports can be configured to operate at more than one operating speed to process packets complying with different protocols and the memory storage device is shared among the plurality of sub-ports such that each sub-port is given access to a plurality of shared resources of the base port at a certain phase of a system clock cycle;
   when there is no conflict for the data at the first stage buffer, storing the data at a storage location of a memory storage device having a plurality of storage locations shared among the plurality of sub-ports;
   scrambling addresses for the plurality of memory storage locations such that a different one of the storage locations is available to the sub-port receiving the data for a next write operation in a next phase when the sub-port is given access to the memory storage device; and
   when there is conflict for the data at the first stage buffer, storing the data at a storage location of a second stage buffer shared among the plurality of sub-ports and used for staging information between the first stage buffer and the memory storage device.

7. The method of claim 6, wherein a first threshold value is used to avoid an overflow condition for the second stage buffer by regulating requests to a scheduler that arbitrates between a plurality of requests for reading information from the plurality of storage locations.

8. The method of claim 7, wherein a second threshold value is used for sending requests to the scheduler and the second threshold value is less than the first threshold value.

9. The method of claim 6, wherein one of the plurality of sub-ports is configured to operate as a Fibre Channel port.

10. The method of claim 6, wherein one of the plurality of sub-ports is configured to operate as an Ethernet or Fibre Channel over Ethernet port.

11. The method of claim 6, wherein the network device is a switch element.

12. The method of claim 6, wherein a scrambling module scrambles the addresses to avoid bank conflicts between a read module that reads from the memory storage device and a write module that writes to the memory storage device.

13. The method of claim 6, wherein storing data at the memory storage device from the second stage buffer when there is no conflict for data at the second stage buffer.

14. A machine-implemented method, comprising:
   (a) providing a memory storage device having a plurality of storage locations for storing information received by a plurality of sub-ports of a base port of a network device, where the plurality of sub-ports can be configured to operate at more than one operating speed to process packets complying with different protocols and the memory storage device is shared among the plurality of sub-ports such that each sub-port is given access to the memory storage device at a certain phase of a system clock cycle;

(b) storing a packet or a portion thereof at one of the storage locations when a sub-port that receives the packet has access to one or more of the storage locations; and (c) scrambling addresses for the memory storage locations such that a different one of the storage locations is available to the sub-port of step (b) for a next write operation in a next phase when the sub-port of step (b) is given access to the memory storage device.

15. The method of claim 14, wherein the base port includes a plurality of first stage buffers for each sub-port for staging information before the information is stored at one of the storage locations of the memory storage device.

16. The method of claim 15, wherein the base port includes a second stage buffer shared among the plurality of sub-ports and used for staging information between the first stage buffers and the memory storage device.

17. The method of claim 14, wherein one of the plurality of sub-ports is configured to operate as a Fibre Channel port.

18. The method of claim 14, wherein one of the plurality of sub-ports is configured to operate as an Ethernet or Fibre Channel over Ethernet port.

19. The method of claim 14, wherein the network device is a switch element.

\* \* \* \* \*

UNITED STATES PATENT AND TRADEMARK OFFICE
CERTIFICATE OF CORRECTION

PATENT NO. : 8,995,455 B1
APPLICATION NO. : 13/678108
DATED : March 31, 2015
INVENTOR(S) : Dropps et al.

Page 1 of 1

It is certified that error appears in the above-identified patent and that said Letters Patent is hereby corrected as shown below:

In the Specification

In column 2, line 67, delete "(e.g." and insert -- (e.g., --, therefor.

In column 3, line 8, delete "(e.g." and insert -- (e.g., --, therefor.

In column 3, line 49, delete "IP." and insert -- IP, --, therefor.

Signed and Sealed this
Twenty-ninth Day of September, 2015

Michelle K. Lee
*Director of the United States Patent and Trademark Office*